(12) United States Patent
Ayyapureddi

(10) Patent No.: US 12,443,484 B2
(45) Date of Patent: Oct. 14, 2025

(54) APPARATUSES AND METHODS FOR VARIABLE INPUT ECC CIRCUITS

(71) Applicant: Micron Technology, Inc., Boise, ID (US)

(72) Inventor: Sujeet Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 71 days.

(21) Appl. No.: 18/444,482

(22) Filed: Feb. 16, 2024

(65) Prior Publication Data

US 2024/0289217 A1     Aug. 29, 2024

Related U.S. Application Data

(60) Provisional application No. 63/487,162, filed on Feb. 27, 2023.

(51) Int. Cl.
  *G06F 11/10*       (2006.01)
(52) U.S. Cl.
  CPC ...... *G06F 11/1068* (2013.01); *G06F 11/1016* (2013.01); *G06F 11/1048* (2013.01)
(58) Field of Classification Search
  CPC ............. G06F 11/1068; G06F 11/1016; G06F 11/1048
  USPC .......................................... 714/764, 774, 800
  See application file for complete search history.

(56) References Cited

U.S. PATENT DOCUMENTS

| | | | | |
|---|---|---|---|---|
| 8,988,979 | B2 * | 3/2015 | Srinivasa | H04L 1/0041 370/206 |
| 2013/0177004 | A1 * | 7/2013 | Srinivasa | H04L 5/0091 370/338 |
| 2021/0360472 | A1 * | 11/2021 | Cao | H04L 27/2605 |
| 2024/0289217 | A1 * | 8/2024 | Ayyapureddi | G06F 11/1068 |

OTHER PUBLICATIONS

Park et al., VL-ECC: Variable Data-Length Error Correction Code for Embedded Memory in DSP Applications, Feb. 2014., IEEE, vol. 61, No. 2, pp. 120-124. (Year: 2014).*
Park et al., Safe Microcontrollers with Error Protection Encoder-Decoder using Bit-Inversion Techniques for on-Chip Flash Integrity Verification, 2013, IEEE, pp. 299-300. (Year: 2013).*

* cited by examiner

*Primary Examiner* — John J Tabone, Jr.
(74) *Attorney, Agent, or Firm* — Dorsey & Whitney LLP

(57) ABSTRACT

Apparatuses, systems, and methods for variable input error correction code (ECC) circuits. Different modes of a memory device may involve different numbers of bits of information (e.g., data and/or metadata) being accessed. An ECC input circuit receives the variable number of bits of information and provides a fixed number of input bits. An ECC engine uses the input bits to generate parity (during a write) or to locate errors (during a read). The number of input bits may be based on a number of inputs of the ECC engine. The ECC input circuit may generate filler bits to add to the bits of information to generate the input bits.

19 Claims, 4 Drawing Sheets

APPARATUSES AND METHODS FOR VARIABLE INPUT ECC CIRCUITS

CROSS-REFERENCE TO RELATED APPLICATIONS

This application claims the filing benefit of U.S. Provisional Application No. 64/487,162, filed Feb. 27, 2023. This application is incorporated by reference herein in its entirety and for all purposes.

BACKGROUND

This disclosure relates generally to semiconductor devices, and more specifically to semiconductor memory devices. In particular, the disclosure relates to volatile memory, such as dynamic random access memory (DRAM). Information may be stored on individual memory cells of the memory as a physical signal (e.g., a charge on a capacitive element). During an access operation, an access command may be received along with address information which specifies which memory cells should be accessed.

Some memories may include on-device error correction. In such devices, the memory array may generate parity bits when data is written to the array, and then during a read using that parity to check the data for errors. The memory may use a network of logic circuits to generate the parity bits and/or perform the corrections. The network may be set up with an expectation of a certain number of input bits, however a single memory device may be operated in different modes which cause different numbers of bits to be accessed.

DETAILED DESCRIPTION

Figure 1:
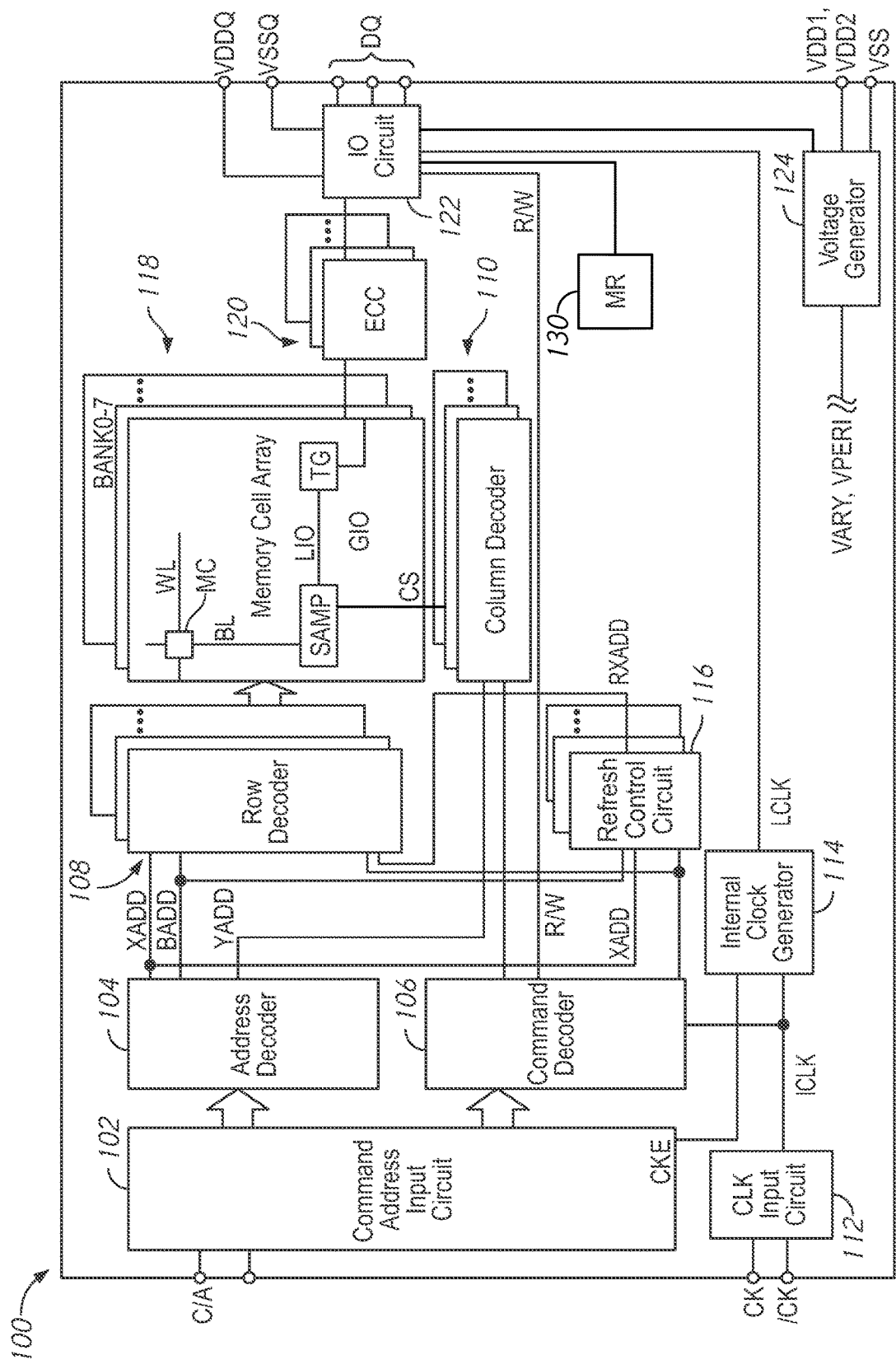
FIG. 1 is a block diagram of a semiconductor device according an embodiment of the disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part thereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Memory arrays may generally include a number of memory cells arranged at the intersection of word lines (rows) and bit lines/digit lines (columns). The columns may be grouped together into column planes, and a column select (CS) signal may be used to select a set of columns within each of the active column planes to provide data. During a write operation, the device receives data (and in some embodiments metadata), and an error correction code (ECC) engine generates parity bits based on the data (and metadata). The data (and metadata) and parity is then written to a word line specified by a row address and to bit lines selected by a column address. During a read operation, the data (and metadata) and parity are read out to the ECC engine, which uses the data (and metadata) and parity to determine if there are errors and/or locate and correct one or more errors in the data (and metadata). The corrected data is then output from the device.

Memory devices may be operated in different modes where different numbers of bits are accessed as part of a single access operation. For example, a memory device may be operated in a 2p2 mode, where 64 data bits are written to or read from the memory array or in a 2p4 mode where 128 data bits are written to or read from the memory array. Similarly, different modes may involve reading/writing different numbers of metadata bits to/from the memory array. The ECC circuit may include a network of logic gates such as a logic tree of XOR gates. The logic tree may assume a certain number of input bits, however in different modes a same memory device may pass different numbers of bits of information (data and/or metadata) through the ECC circuit. It may be useful for the ECC circuit to accommodate a different number of inputs without the need for changing the logic tree for different modes.

The present disclosure is drawn to apparatuses, systems, and methods for variable input ECC circuits. An ECC circuit includes a ECC input circuit and an ECC engine. The ECC input circuit receives a variable number of bits of data and/or metadata and outputs a fixed number of input bits to the ECC engine. The ECC engine may generate parity bits based on the input bits (in a write operation) or use parity bits to correct/detect errors in the input bits. The ECC input circuit may receive a number of data and metadata bits which is lower than the number of input bits and add additional filler bits to generate the input bits. For example, the filler bits may have a fixed value (e.g., all logical highs, all logical lows) or have a set pattern (e.g., alternating highs and lows). In some embodiments, the filler bits may be generated based on the structure of the logic tree in the ECC engine. This may allow the ECC engine to operate based on an assumed fixed number of bits, even though the ECC circuit as a whole receives a variable number of bits based on the mode the device operates in.

For example, the memory device may be operated in module using a 5×2p4 mode. During a write operation the controller provides 128 bits of data to the ECC circuit. In this example, that may represent a maximum number of bits the memory device is capable of receiving as part of a single access operation, so no additional filler bits are needed, and the 128 data bits are provided to the ECC circuit, which generates 8 parity bits. The same design of ECC circuit may also be used in a memory device on a module using a 9×2p2 mode, where during a write operation the controller provides 64 bits of data to the ECC circuit. To make up for the difference, an ECC input circuit may generate 64 filler bits which together with the 64 data bits form 128 input bits. Other numbers of input bits may be used in other example embodiments. In addition to varying based on the architecture of the module and the mode the memory is operated in, different numbers of metadata bits may also cause the number of bits of information provided to the ECC circuit to change.

As used herein, the term data may represent any bits of information that the controller wishes to store and/or retrieve from the memory. The term metadata may represent any bits of information about the data which the controller writes to and/or receives from the memory. For example, the metadata may be information that the controller generates about the data, about how or where the data memory is stored in the memory, about how many errors have been detected in the data, etc. The data and the metadata together represent information written to the memory by a controller and then also read from the memory by the controller, with the data and metadata differing in content and how they are generated in that the metadata is based on information about the data. The term parity may represent any bits generated by an error correction circuit of the memory based on the data, metadata, or combinations thereof. The parity may generally stay within the memory. In some embodiments, the amount of data and/or metadata retrieved as part of a single access operation may represent a set of bits which are a fragment of a larger piece of information. For example, the metadata bits retrieved as part of a single access operation (e.g., 4 bits) may not have any meaning on their own, but may have meaning when combined with sets of metadata bits retrieved as part of other access operations (e.g., to other memory arrays and/or to the same array at different times).

FIG. 1 is a block diagram of a semiconductor device according an embodiment of the disclosure. The semiconductor device 100 may be a semiconductor memory device, such as a DRAM device integrated on a single semiconductor chip. The device may be operated by a controller, such as a processor, not pictured in FIG. 1.

The semiconductor device 100 includes a memory array 118. The memory array 118 is shown as including a plurality of memory banks. In the embodiment of FIG. 1, the memory array 118 is shown as including eight memory banks BANK0-BANK7. More or fewer banks may be included in the memory array 118 of other embodiments. Each memory bank includes a plurality of word lines WL, a plurality of bit lines BL, and a plurality of memory cells MC arranged at intersections of the plurality of word lines WL and the plurality of bit lines BL. The selection of the word line WL is performed by a row decoder 108 and the selection of the bit lines BL is performed by a column decoder 110. In the embodiment of FIG. 1, the row decoder 108 includes a respective row decoder for each memory bank and the column decoder 110 includes a respective column decoder for each memory bank.

The bit lines BL are coupled to a respective sense amplifier (SAMP). Read data from the bit line BL is amplified by the sense amplifier SAMP, and transferred to an ECC circuit 120 over local data lines (LIO), transfer gate (TG), and global data lines (GIO). Conversely, write data outputted from the ECC circuit 120 is transferred to the sense amplifier SAMP over the complementary main data lines GIO, the transfer gate TG, and the complementary local data lines LIO, and written in the memory cell MC coupled to the bit line BL.

The semiconductor device 100 may employ a plurality of external terminals, such as solder pads, that include command and address (C/A) terminals coupled to a command and address bus to receive commands and addresses, clock terminals to receive clocks CK and /CK, data terminals DQ coupled to a data bus to provide data, and power supply terminals to receive power supply potentials VDD, VSS, VDDQ, and VSSQ.

The clock terminals are supplied with external clocks CK and /CK that are provided to an input circuit 112. The external clocks may be complementary. The input circuit 112 generates an internal clock ICLK based on the CK and /CK clocks. The ICLK clock is provided to the command decoder 106 and to an internal clock generator 114. The internal clock generator 114 provides various internal clocks LCLK based on the ICLK clock. The LCLK clocks may be used for timing operation of various internal circuits. The internal data clocks LCLK are provided to the input/output circuit 122 to time operation of circuits included in the input/output circuit 122, for example, to data receivers to time the receipt of write data. The input/output circuit 122 may include a number of interface connections, each of which may be couplable to one of the DQ pads (e.g., the solder pads which may act as external connections to the device 100).

The C/A terminals may be supplied with memory addresses. The memory addresses supplied to the C/A terminals are transferred, via a command/address input circuit 102, to an address decoder 104. The address decoder 104 receives the address and supplies a decoded row address XADD to the row decoder 108 and supplies a decoded column address YADD to the column decoder 110. The decoded row address XADD may be used to determine which row should be opened, which may cause the data along the bit lines to be read out along the bit lines. The column decoder 110 may provide a column select signal CS, which may be used to determine which sense amplifiers provide data to the LIO. The address decoder 104 may also supply a decoded bank address BADD, which may indicate the bank of the memory array 118 containing the decoded row address XADD and column address YADD.

The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 102. The command decoder 106 includes circuits to decode the internal command signals to generate various internal signals and commands for performing operations. For example, the command decoder 106 may provide signals which indicate if data is to be read, written, etc.

The memory includes a mode register 130 which may be used to control various aspects of the memory 100. For example, the mode register 130 may include one or more setting registers which specify various settings of the memory. Some registers may include settings which may be changed by the controller, for example, the controller may perform a mode register write operation to set values of one or more setting registers. Some registers may be read only, and may be set based on a non-volatile storage of the memory, such as a fuse setting which is loaded into the mode register at power up/reset of the memory 100. The controller 150 may perform a mode register read operation to check the value of various registers, which may contain information about various settings, conditions of the memory (e.g., temperature), error reports (e.g., error check and scrub information), other information, or combinations thereof. In some embodiments, the mode register 130 may be used to enable different modes of the memory, such as how many data bits and which DQ terminals are used, as described herein. In some embodiments, the mode register 130 may be used to enable/disable metadata bits and/or to set a number of the metadata bits.

The device 100 may receive an access command which is a write command. When the write command is received, and a bank address, a row address and a column address are timely supplied with the write command by the controller, write data (and metadata) supplied to the data terminals DQ by the controller are provided along the data bus and written to a memory cells in the memory array 118 corresponding to the row address and column address. The write command is received by the command decoder 106, which provides internal commands so that the write data along with any additional information (e.g., metadata) is received by data receivers in the input/output circuit 122. The ECC circuit 120 generates number of parity bits based on a set number of input bits, which includes the received data and metadata. The data, metadata and parity are provided by the ECC circuit 120 to the memory array 118 to be written into the memory cells MC which are specified by the row and column address.

The device 100 may receive an access command which is a read command. When a read command is received, and a bank address, a row address and a column address are timely supplied with the read command by the controller, read data (and metadata) is read from memory cells in the memory array 118 corresponding to the row address and column address. The read command is received by the command decoder 106, which provides internal commands so that read data, metadata, and read parity bits from the memory array 118 is provided to the ECC circuit 120. The ECC circuit generates a set of input bits which includes the data and metadata. The ECC circuit uses in the input bits and the parity bits from the array to detects and/or corrects errors in the input bits. The correct read data and metadata is provided along the data bus and output to outside from the data terminals DQ via the input/output circuit 122.

The ECC circuit 120 includes an ECC input circuit which receives a variable number of bits of information (e.g., data and metadata) either from the IO circuit 122 (e.g., in a write operation) or from the memory array 118 (e.g., in a read operation). The number of bits of information may be based on various settings of the mode register 130, which specify how many data bits and metadata bits are associated with a given access operation. If the number of bits is below an expected number of input bits, then an ECC input circuit may generate additional filler bits to bring the number of input bits up to the expected number.

The filler bits may be generated in a consistent fashion between both write and read operations. For example, the filler bits may be generated with a set value (e.g., all highs or all lows) or based on a known pattern (e.g., alternating highs and lows). Since the filler bits are generated in a predictable way, the input bits received by the ECC circuit may be consistent for a given set of information (data and metadata) between a write and read operation (assuming no errors). If there is an error, the error will remain in the read information, and not propagate to the filler bits. Accordingly, the ECC circuit 120 may properly detect/correct the error in the information, before providing the corrected information (but not the filler bits) to the IO circuit 122.

The device 100 includes refresh control circuits 116 each associated with a bank of the memory array 118. Each refresh control circuit 116 may determine when to perform a refresh operation on the associated bank. The refresh control circuit 116 provides a refresh address RXADD (along with one or more refresh signals, not shown in FIG. 1). The row decoder 108 performs a refresh operation on one or more word lines associated with RXADD. The refresh control circuit 116 may perform multiple types of refresh operation, which may determine how the address RXADD is generated, as well as other details such as how many word lines are associated with the address RXADD.

The power supply terminals are supplied with power supply potentials VDD and VSS. The power supply potentials VDD and VSS are supplied to an internal voltage generator circuit 124. The internal voltage generator circuit 124 generates various internal potentials VARY, and the like based on the power supply potentials VDD and VSS supplied to the power supply terminals.

The power supply terminals are also supplied with power supply potentials VDDQ and VSSQ. The power supply potentials VDDQ and VSSQ are supplied to the input/output circuit 122. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 2:
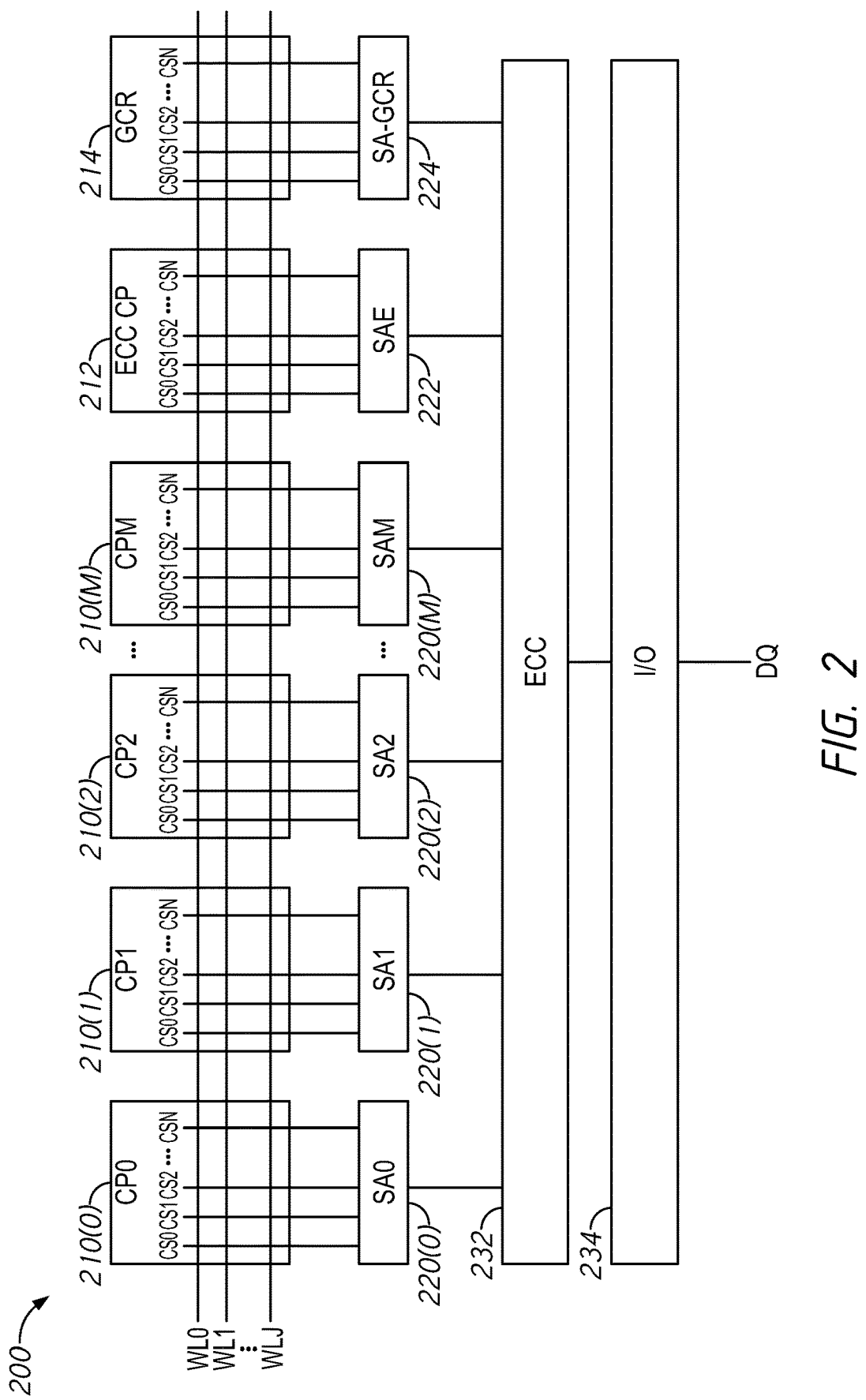
FIG. 2 is a block diagram of a memory device according to some embodiments of the present disclosure.

FIG. 2 is a block diagram of a memory device according to some embodiments of the present disclosure. The memory device 200 may, in some embodiments, represent a portion of the memory device 100 of FIG. 1. The view of FIG. 2 shows a portion of a memory array 210-214 and 220-224 which may be part of a memory bank (e.g., 118 of FIG. 1) along with selected circuits used in the data path such as the ECC circuit 232 (e.g., 120 of FIG. 1) and IO circuits 234 (e.g., 122 of FIG. 1). For clarity certain circuits and signals have been omitted from the view of FIG. 2.

The memory device 200 is organized into a number of column planes 210-214. Each of the column planes represents a portion of a memory bank. Each column plane 210-214 includes a number of memory cells at the intersection of word lines WL and bit lines. The word lines may be extend across multiple of the column planes 210-214. The bit lines may be grouped together into sets which are activated by a column select signal CS provided by a column decoder (e.g., 110 of FIG. 1).

For the sake of clarity, only a single vertical line is used to represent the bit lines of each column select set in a given column plane, however, there may be multiple bit lines accessed by each CS value in each column plane. For example, each vertical line may represent 8 bit lines, all accessed in common by a value of CS. As used herein, a 'value' of CS may refer to a decoded signal provided to sets of bit lines. So a first value may represent a first value of a multibit CS signal, or after decoding a separate binary signal (e.g., a signal line being active). For example, if the (predecoded) CS signal is 6 bit signal (e.g., with 64 values), then there may 64 different decoded CS signals.

The memory 200 includes a set of data column planes 210 as well as an extra column plane or ECC column plane 212. The extra column plane 212 may generally be used to store the parity bits. In some embodiments, the memory 200 may also include an optional global column redundancy (GCR) column plane 214. In some embodiments, the GCR plane 214 may have fewer memory cell (e.g., fewer column select groups) than the data column planes 210. The GCR CP 214 includes a number of redundant columns which may be used as part of a repair operation. For example, if a value of the CS signal is identified as including defective memory cells in one of the data column planes 210, then the memory may be remapped such that the information which would have been stored in that column plane for that value of CS is instead stored in the GCR CP 214.

An example memory device 200 according to some embodiments of the present disclosure may include 16 data column planes 210(0)-210(15). Each of those data column planes 210 includes 64 sets of bit lines (e.g., CS sets) activated by a value of the column select signal, and each set of bit lines includes 8 bit lines. Accordingly, when a word line is opened responsive to a row address, and a column select signal is provided to each of the 16 column planes then 8 bits are accessed from each of the 16 column planes for a total of 128 bits. The column select signal is also provided to the ECC CP 212, which accesses an additional 8 bits of default parity associated with the 128 bits. If a repair has been performed, the GCR CP 214 may also be accessed and the information accessed in the GCR CP 214 may be swapped for the information accessed from the repaired CP (e.g., by multiplexing a GCR local input/output line onto the repaired LIO line). Accordingly, the maximum number of bits that can be retrieved as part of an access pass in the example memory device is 128 bits from the data column planes 210 (with 8 bits substituted from the GCR CP 214 if there has been a repair) along with 8 additional bits from the extra CP 212. For the sake of consistency, reference will generally be made throughout to these example values, however, it should be understood that embodiments of the present disclosure may have a different architecture, which involves more or fewer column planes, more or fewer bit lines per CS set, more or fewer, CS sets per column plane, and so forth.

The ECC circuit 232 receives bits of information (data and metadata) from the IO circuit 234, generates parity and provides the information and the parity to the column planes 210-214 as part of a write operation. As part of a read operation, the ECC circuit 232 receives information and parity from the column planes 210-214, detects and/or corrects errors in the information and provides the corrected information to the IO circuit 234. The ECC circuit generate parity and detect/correct errors based on a number of bits which is set based on an architecture of an ECC engine. However, the number of bits of information may vary based on an operational mode of the memory device. Accordingly, the ECC circuit 232 may use an ECC input circuit (as described in more detail herein) to generate a number of input bits which include the information. While the number of bits of information may vary between operational modes, the input bits used by the ECC engine may remain consistent. In this manner, the memory device may be operated in different modes without the need to alter the architecture of the ECC engine.

Several example modes of operation are described as an illustrative example of how different modes may change the amount of information received by the ECC circuit during read and write operations. Depending on the mode of the device, different amounts of information may be stored in the array 200, and may be stored using different mapping of which column planes 210 are used to store the information based on the column address. Different methods of accessing the array may also be used. For example, in some modes, a single access pass may be used to store the information, and in some modes two access passes may be used to store the information. For the sake of explanation, the operation of the array will be described with respect to a handful of example modes and certain amounts of metadata, however additional modes may also be used in other example embodiments. Similarly, different amounts of metadata other than those described may be used with the different modes, or different combinations of the described modes and the described amount of metadata.

As an example, the ECC circuit will be described with respect to a fixed input of 128 bits, which may generally be divided between data and metadata bits per access operation. Other numbers of bits and other distributions of data and metadata may be used in other example embodiments.

The memory may be operated in a 5×2p4 mode with 4B of metadata. In other words, the device may be packaged on a memory module as one of 4 data devices (and one error correction device). Each data device has two pseudo-channels, each of which include four DQ terminals. The four bytes of metadata is distributed across the data memory devices, so each individual device stores 8 bits of metadata.

In an example write operation, a controller (e.g., 150 of FIG. 1) provides data and metadata to the memory device. In the 5×2p4 mode with 4B of metadata, 128 bits of data are provided along with 8 bits of metadata, such that each of the four DQ terminals per pseudo-channel receives a burst length of 34 (32 data bits and 2 metadata bits). The I/O circuit 234 may store the metadata bits while the data bits are written to the column planes as part of a first access pass. The 128 data bits is provided to the ECC circuit 332 which generates a set of parity bits based on the data bits. For example 8 parity bits may be generated based on the 128 data bits. Since the number of bits already matches the expected number of input bits, the ECC input circuit may pass the data and metadata without requiring any additional filler bits.

The data and the parity is written to the data column planes 210 and extra column plane 212 as part of a first access pass. For example, a column decoder provides CS with a first value based on the column address. The data is provided along GIO and LIO lines through the sense amplifiers 220 to the column planes 210 and the parity is provided along GIO and LIO lines through the sense amplifiers 222 to the column planes 212. In some embodiments, the same CS signal may be sent to each of the column planes 210 and 212.

Also as part of the example write operation, a second access pass may be performed. The column decoder provides a different value of the CS signal, and the metadata is written to locations based on that CS signal. For example, the metadata may be written to one of the data column planes 210, but along a bit line reserved for metadata.

In some embodiments, the metadata may not be protected by the ECC circuit. In some embodiments, the metadata may be part of a codeword of metadata which is protected separately from the data. For example as part of writing the metadata, a codeword of 128 bits may be read out along with associated parity (and corrected by the ECC circuit 232 if applicable). The new metadata may overwrite a part of that codeword, and then the ECC circuit 232 generates new parity based on the modified codeword, and the codeword of metadata and its new parity is written to the column planes 210 and 212 respectively.

In some embodiments, the ECC circuit may be set up to accommodate a number of bits such that the metadata is protected directly along with the data. For example, the ECC engine of the ECC circuit 232 may accommodate 136 input bits, and the data and metadata may be passed through together to allow for parity bits to be generated, and then the metadata may be stored while the data is written.

In an example read operation, a first access pass may be performed which retrieves the 8 bits of metadata. For example, the second CS value is provided by the column decoder and the metadata is retrieved from the column plane 210 it was saved in, and stored in the I/O circuit 334. During a second access pass, the column decoder provides the first CS signal to the column planes 310 and 312 and the data bits are read from the column planes 310 while the parity bits are read from the extra CP 312. Again, since 128 data bits and 8 parity bits is expected, the data may pass through the ECC input circuit without modification. The data (e.g., 128 bits), parity (e.g., 8 bits) and metadata (8 bits) are provided to the ECC circuit 332 which performs error correction on the data and the metadata based on the data, metadata, and parity bits. The corrected data bits are provided to the I/O circuit 334, where they are joined with the metadata bits and then provided to the DQ terminals.

Another example operational mode is a 9×2p2 mode with 4B of metadata. In such an embodiment, the memory device may be packaged onto a module with a total of 8 memory devices and one error correction memory device. Each device may have two pseudo-channels, each of which includes two DQ terminals. Each DQ terminal may receive 32 bits of data and 2 bits of metadata as part of an access operation, for a total of 64 bits of data and 4 bits of metadata per access operation.

In an example write operation in the 9×2p2 mode, the ECC IO circuit may receive the 64 data bits and 4 metadata bits and provide them to the ECC circuit 232. An ECC input circuit provides filler bits because the total number of bits (68 bits) is less than the expected number of input bits (e.g., 128). Accordingly, the ECC input circuit may generate 60 additional filler bits to make up the input bits, and the input bits may be provided to the ECC engine and used to generate the parity bits (e.g., 8 parity bits). The data, metadata, and parity may then all be written to the column planes 210-214 as part of a single access pass. For example, the data column planes 210 may be divided into two sets, each associated with a value of a column plane select bit in the column address (e.g., CA10). The data 210 may be stored using a first CS value in the column planes 210 selected by the column plane select bit. The parity may be stored in the ECC column plane 212. The metadata may be stored using a second CS value in one or more of the column planes 210 which are not selected by the column plane select bit.

In an example read operation in the 9×2p2 mode, the column decoder generates the first and the second CS values and retrieves the data and metadata from the column planes 210 they were stored in (e.g., 64 data bits and 4 metadata bits). The parity bits are also read out. The 68 bits of information are provided to the ECC circuit 232. As with the write information, during the read operation, the ECC input circuit generates an additional 60 filler bits to the generate 128 total input bits. The 128 input bits and the 8 parity bits are provided to an ECC engine, which locates/corrects errors in the 128 input bits. Since the filler bits are generated in a consistent fashion, the error may be limited to the bits of information and not the filler bits. Accordingly, errors which are detected/corrected will be in the data/metadata rather than the filler bits. The corrected data/metadata (but not the filler) is provided to the IO circuit 234 and to the DQ terminals for the controller.

Figure 3:
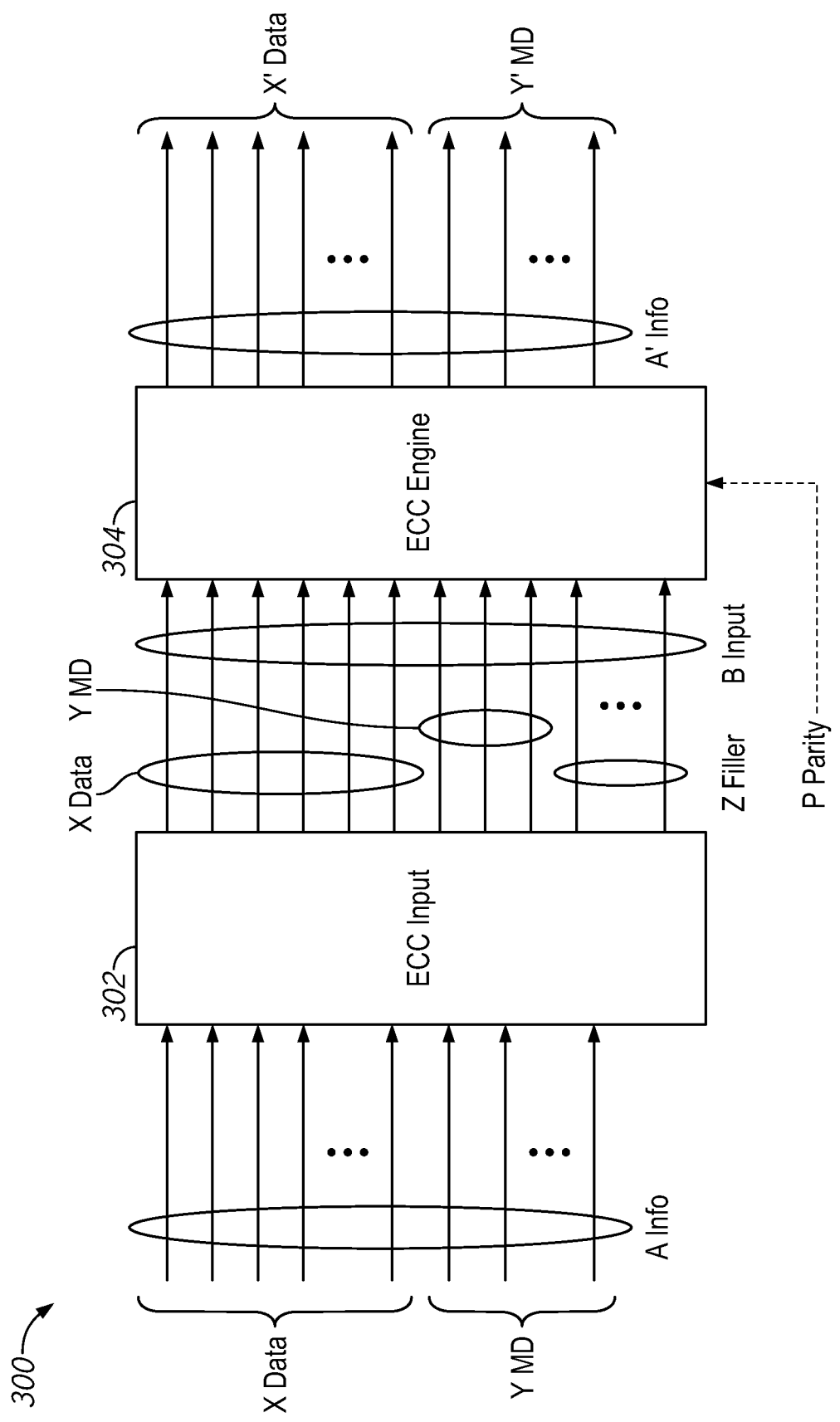
FIG. 3 is a block diagram of an ECC circuit according to some embodiments of the present disclosure.

FIG. 3 is a block diagram of an ECC circuit according to some embodiments of the present disclosure. The ECC circuit 300 may, in some embodiments, implement the ECC circuit 120 of FIGS. 1 and/or 232 of FIG. 2. The ECC circuit 300 shows a ECC input circuit 302 and an ECC engine 304. The ECC input circuit 302 receives a number of bits of information A, which may be variable based on how the memory device has been configured and what mode it is operating in, and provides a fixed number of input bits B. The number of input bits B may be based on an architecture of the ECC engine 304 and may not change between operational modes/configurations/etc. The ECC engine 304 either generates parity bits based on the B input bits as part of a write operation, or performs corrections on the B input bits based on parity bits as part of a read operation. The ECC engine 304 provides the A bits of information but not any filler bits used to make up the input bits.

The ECC input circuit 302 receives A bits of information. The A information bits includes X data bits and Y metadata bits (e.g., A=X+Y). The ECC input circuit 302 may compare the number of received bits of information A to a number B of expected input bits. If the number A is less than the number B, then the ECC input circuit 302 may generate a number of filler bits Z to make up the difference (e.g., Z=B−A). If the number of bits A matches the input value B, then no filler bits may be generated.

In some embodiments, the Z filler bits may all have a same logical value (e.g., all high or all low). In some embodiments, the Z filler bits may have different values. For example a pattern may be used (e.g., alternating high and low) to generate the filler bits. In some embodiments, the filler bits may be generated algorithmically, for example using a sequence of logic gates based on the structure of the ECC engine.

The ECC input circuit 302 provides a set of B input bits. The B input includes the data, the metadata, and the filler bits (e.g., B=X+Y+Z). The number B may be based on a number of inputs expected by the ECC engine 304. The ECC engine 304 includes a logic tree. During a write operation the logic tree may be used to generate the P parity bits. During a read operation the logic tree may be used in a similar fashion to generate parity which may be compared to the read P parity bits to determine if there is a difference, which may indicate an error. The logic tree may include a number of logic gates (e.g., XOR gates) which are coupled together to form the logic tree. Based on the structure of the logic tree, there may be a set number of inputs. Accordingly, the B input bits may match the number of inputs expected by the structure of the logic tree in the ECC engine 304.

During a write operation, the ECC input circuit receives the A information bits from the IO circuit (e.g., 122 of Figure and/or 234 of FIG. 2) and generate B input bits. The ECC engine 304 may receive the B input bits and generate P parity bits. The A information bits (e.g., the X data bits and Y metadata bits) are then provided along with the P parity bits to be written to the memory array. The filler bits may remain within the ECC circuit 300. During a read operation, the ECC input circuit 302 receives the A information bits from the memory array, and provides the B input bits. The ECC engine 304 receives the B input bits from the ECC input circuit 302 as well as the P parity bits from the memory array and detects/corrects errors in the B input bits based on the B input bits and the P parity bits. The corrected A information bits A' are provided to the IO circuit.

Figure 4:
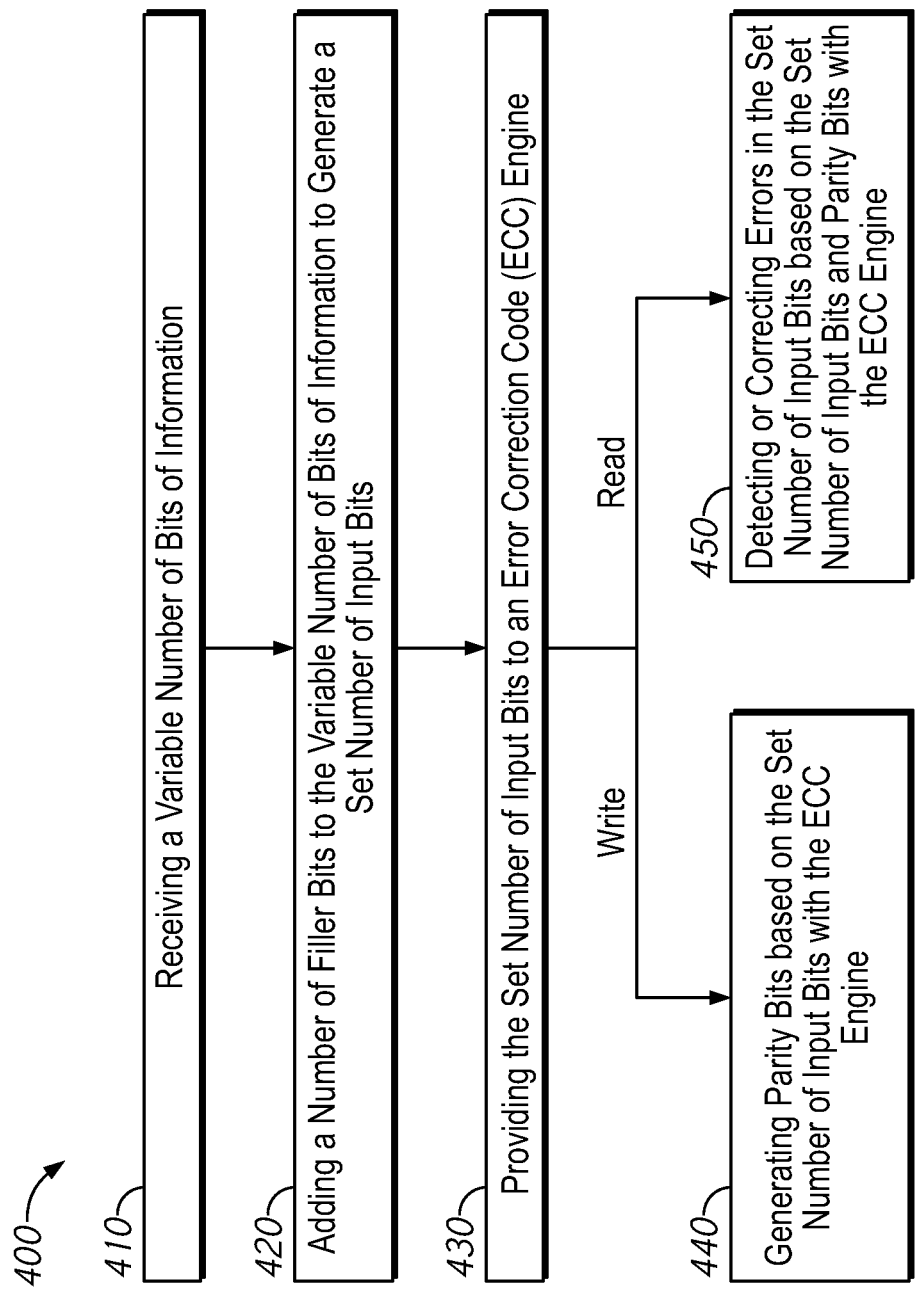
FIG. 4 is a flow chart of a method of generating a set number of input bits for an ECC circuit according to some embodiments of the present disclosure.

FIG. 4 is a flow chart of a method of generating a set number of input bits for an ECC circuit according to some embodiments of the present disclosure. The method 400 may, in some embodiments, be implemented by any of the apparatuses and/or systems described herein. For example, the method 400 may be implemented by the ECC circuit 120 of FIG. 1, 232 of FIG. 2, and/or 300 of FIG. 3.

The method 400 may generally begin with box 410, which describes receiving a variable number of bits of information. The information may include data and metadata. In some embodiments, the method 400 may include setting a number of bits of information based on an operational mode of the memory. The method 400 may include receiving the number of bits of information with an ECC input circuit (e.g., 302 of FIG. 2) as part of an access operation. The method 400 may include receiving the information from a controller as part of write operation (e.g., along DQ terminals and an IO circuit). The method 400 may include receiving the information from a memory array as part of a read operation.

Box 410 may be followed by box 420, which describes adding a number of filler bits to the variable number of bits of information to the generate a set number input bits. The ECC input circuit (e.g., 302 of FIG. 3) may generate the number of input bits. The method 400 may include comparing the number of bits of information to the set number of input bits. If the number of bits of information matches the set number of input bits, then the method 400 may include providing the bits of information as the input bits. If the number of bits of information is less than the number of input bits, then the method 400 may include generating filler bits and adding them to the bits of information to generate the input bits. The method 400 may include generating a number of filler bits which is a difference between the number of input bits and the number of information bits. In some embodiments, the method 400 may include generating the filler bits with a same value. In some embodiments, the method 400 may include generating the filler bits with different values.

Box 420 may generally be followed by box 430, which describes providing the set number of input bits to an ECC engine (e.g., 304 of FIG. 3). If the access operation is a write operation, box 430 is followed by box 440, which describes generating parity bits based on the set number of input bits with the ECC engine. The method 400 may include writing the number of bits of information and the parity bits to a memory array as part of the write operation. If the access operation is a read operation, then box 430 may be followed by box 450, which describes detecting or correcting errors in the set number of input bits based on the set number of input bits and parity bits with the ECC method. The method 400 may include reading the parity bits from the memory array. The method 400 may include providing the corrected number of bits of information to a controller (e.g., through an IO circuit and DQ terminals).

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
   an error correction code (ECC) input circuit configured to receive a first number of bits of information and provide a second number of input bits, wherein the second number of input bits includes the first number of bits of information, wherein the first number varies based on an operational mode of the apparatus, and wherein the second number is a fixed value; and
   an ECC engine configured to generate parity bits based on the second number of input bits as part of a write operation.

2. The apparatus of claim 1, wherein the ECC input circuit is configured to generate a third number of filler bits, wherein the first number plus the third number equals the second number.

3. The apparatus of claim 2, wherein the filler bits have a same value with each other.

4. The apparatus of claim 1, wherein the ECC engine is configured to locate errors in the second number of input bits based on the second number of input bits and the parity bits as part of a read operation.

5. The apparatus of claim 1, wherein the first number of bits of information includes data, metadata, or a combination thereof.

6. The apparatus of claim 1, wherein the ECC input circuit is configured to generate a third number of filler bits if the first number is less than the second number, and wherein the second number of input bits includes the first number of bits of information and the third number of filler bits.

7. The apparatus of claim 1, wherein the second number of input bits is based on a number of input terminals of a logic tree of the ECC engine.

8. An apparatus comprising:
   a memory array;
   at least one data terminal configured to receive a first number of bits of information during a write operation in a first mode and to receive a second number of bits of information during a write operation in a second mode, wherein the first number and the second number of different to each other;
   an error correction code (ECC) circuit configured to generate parity bits based on a third number of input bits as part of the write operation, wherein the input bits include the first or second number of bits of information; and
   a column decoder configured to write the parity bits and the first number or the second number of bits of information to the memory array.

9. The apparatus of claim 8, wherein the third number is greater than or equal to the first number or the second number.

10. The apparatus of claim 8, wherein the first number of bits of information include data, metadata, or combinations thereof.

11. The apparatus of claim 8, wherein the column decoder is further configured to read the parity bits and the first or the second number of bits of information from the memory array as part of a read operation, and wherein the ECC circuit is further configured to locate errors in the third number of input bits based on the input bits and the parity bits as part of the read operation.

12. The apparatus of claim 8, wherein the ECC circuit comprises:
   an ECC input circuit configured to receive the first or the second number of information bits and provide the third number of input bits; and
   an ECC engine configured to generate the parity bits based on the input bits.

13. The apparatus of claim 12, wherein the ECC input circuit is configured to generate a fourth number of filler bits, wherein the third number of input bits includes the filler bits, and wherein the fourth number equals the third number minus the first or the second number.

14. The apparatus of claim 12, wherein the first mode includes receiving the first number of bits of information along a first number of the at least one input terminals and wherein the second mode includes receiving the second number of bits of information along a second number of the at least one input terminals.

15. A method comprising: receiving a variable number of bits of information;
   adding a number of filler bits to the variable number of bits of information to generate a set number of input bits; and
   providing the set number of input bits to an error correction code (ECC) engine;
   determining the variable number of bits of information based on a mode of a memory device.

16. The method of claim 15, further comprising generating parity bits based on the set number of input bits with the ECC engine as part of a write operation.

17. The method of claim 15, further comprising detecting or correcting errors in the set number of input bits based on the set number of input bits and parity bits with the ECC engine as part of a read operation.

18. The method of claim 15, further comprising comparing the variable number of bits of information to the set number of input bits and determining the number of the filler bits based on the comparison.

19. The method of claim 15, further comprising generating the filler bits with a same value.

* * * * *